(12) United States Patent
Inagaki et al.

(10) Patent No.: US 8,873,945 B2
(45) Date of Patent: Oct. 28, 2014

(54) IMAGE PICKUP APPARATUS

(71) Applicant: Canon Kabushiki Kaisha, Tokyo (JP)

(72) Inventors: Chifuyu Inagaki, Tokyo (JP); Hiroshi Akada, Kawasaki (JP); Makoto Miyawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/162,881

(22) Filed: Jan. 24, 2014

(65) Prior Publication Data

US 2014/0212126 A1  Jul. 31, 2014

(30) Foreign Application Priority Data

Jan. 28, 2013  (JP) ................. 2013-012935

(51) Int. Cl.
*G03B 17/02* (2006.01)
*H04N 5/225* (2006.01)
(52) U.S. Cl.
CPC .................... *G03B 17/02* (2013.01)
USPC .......................... 396/535; 348/535

(58) Field of Classification Search
USPC ............ 396/350, 424, 535, 541; 348/333.06, 348/373–376
See application file for complete search history.

(56) References Cited

U.S. PATENT DOCUMENTS 5,815,759 A * 9/1998 Tseng et al. ................. 396/541
2009/0174803 A1 * 7/2009 Nishino et al. .......... 348/333.06

FOREIGN PATENT DOCUMENTS

JP  4378133 B  12/2009

\* cited by examiner

*Primary Examiner* — Clayton E LaBalle
*Assistant Examiner* — Minh Phan
(74) *Attorney, Agent, or Firm* — Cowan, Liebowitz & Latman, P.C.

(57) ABSTRACT

An image pickup apparatus includes a camera body 1 including a monitor unit 11, a lens barrel 2 and a lens body 3 which include an image pickup optical system L, a rotary portion 8 provided between the camera body 1 and the lens body 3, and rotatably supporting the lens body 3 with respect to the camera body 1, absorption portions 12*a* and 12*b* attached to the camera body 1, and a cover portion 4 movably connected with respect to the camera body 1 and covering the absorption portions 12*a* and 12*b*.

8 Claims, 8 Drawing Sheets

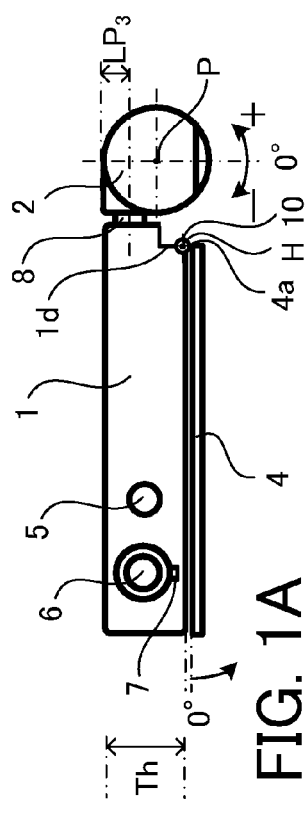
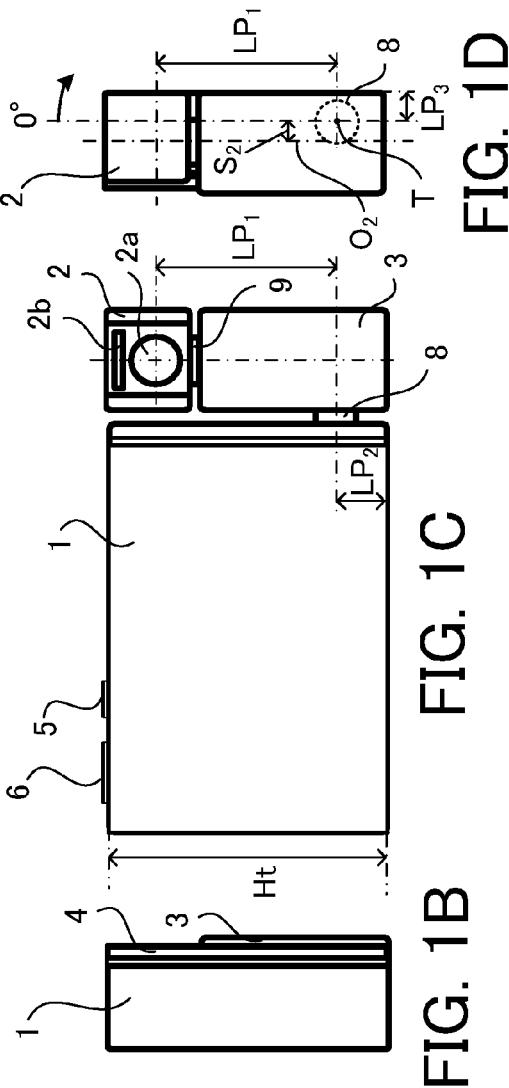
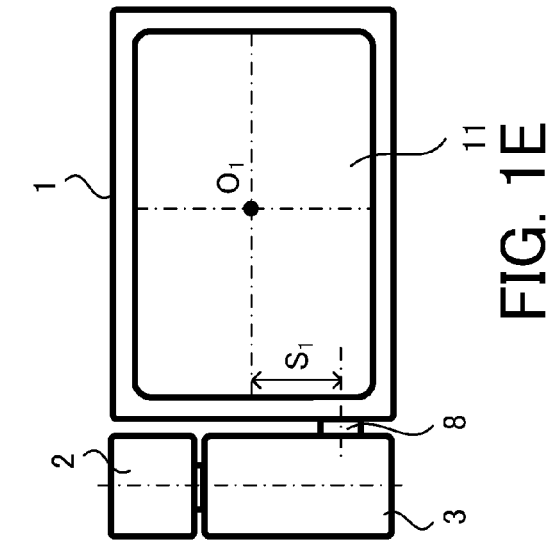
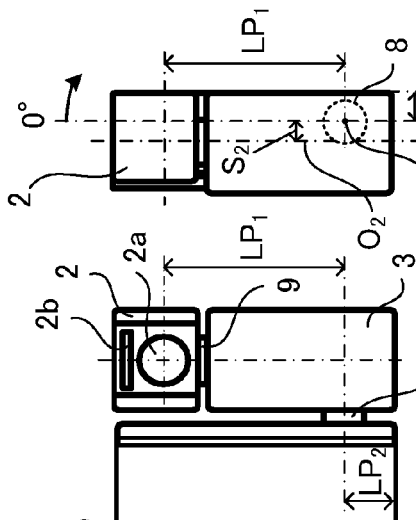
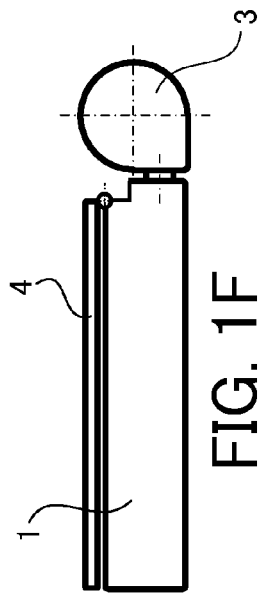

of an image pickup apparatus

IMAGE PICKUP APPARATUS

BACKGROUND OF THE INVENTION

1. Field of the Invention

The present invention relates to an image pickup apparatus in which a lens body is rotatable with respect to a camera body.

2. Description of the Related Art

Conventionally, image pickup apparatuses have been proposed that have a mechanism in which a lens body (image pickup portion) is rotatable with respect to a camera body. This mechanism, as one of its advantages, allows an image pickup apparatus to be flat-shaped during normal time, making the apparatus convenient to carry. As another advantage, this mechanism permits shooting in various angles such as high and low angles when an image pickup portion is rotated with respect to a camera body. There are a variety of requests for more convenient shooting. One example is that users desire themselves to be photographed in a group photograph they take. Another example is that users desire to easily take nightscape photographs. However, it is not desired to carry a tripod or other similar supporting tool at all times.

Japanese Patent No. 4378133 discloses an electronic camera which includes a camera body (operating portion) and a lens body (image pickup portion) that is rotatably supported with respect to the camera body. The electronic camera disclosed in Japanese Patent No. 4378133 is flat-shaped during normal time while it enables high and low angle shooting in comfortable postures with its image pickup portion being rotated during shooting.

However, the configurations of conventional electronic cameras require the use of a tripod or other similar supporting tool and carrying the same. This makes it difficult to easily perform shooting according to various shooting situations.

SUMMARY OF THE INVENTION

The present invention provides an image pickup apparatus which enables easy and appropriate shooting in various shooting situations.

An image pickup apparatus as an aspect of the present invention includes a first housing including a display unit, a second housing including an image pickup optical system, a rotary portion provided between the first housing and the second housing and rotatably supporting the second housing with respect to the first housing, a first absorption portion attached to the first housing, and a cover member movably connected with respect to the first housing and covering the first absorption portion.

Further features and aspects of the present invention will become apparent from the following description of an exemplary embodiment with reference to the attached drawings.

BRIEF DESCRIPTION OF THE DRAWINGS

FIGS. 1A to 1F are external views of an image pickup apparatus in this embodiment.

DESCRIPTION OF THE EMBODIMENTS

Figure 2:
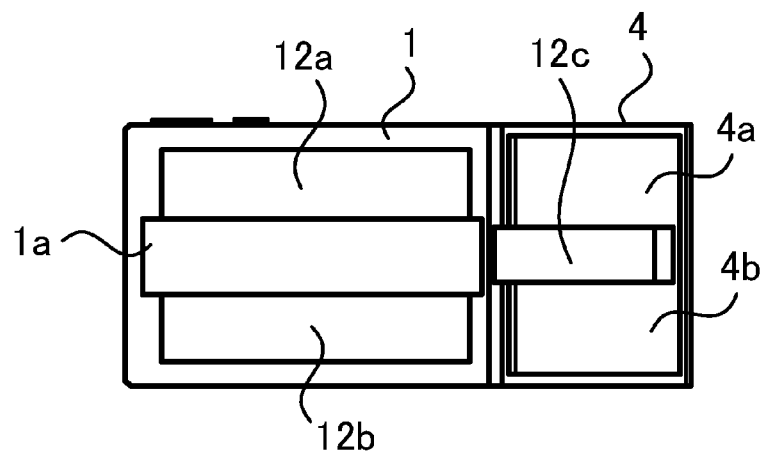
FIG. 2 is a diagram illustrating the image pickup apparatus in this embodiment with its cover portion opened.

An exemplary embodiment of the present invention will be described below with reference to the accompanied drawings. In each of the drawings, the same elements will be denoted by the same reference numerals and the duplicate descriptions thereof will be omitted.

First of all, referring to FIGS. 1A to 1F and 2, the configuration of an image pickup apparatus in this embodiment will be described. FIGS. 1A to 1F are external views of the image pickup apparatus in this embodiment as seen from six directions. FIGS. 1A to 1F are a top view, a left side view, an elevation view, a right side view, a rear view, and a bottom view, respectively. In this embodiment, the state illustrated in FIGS. 1A to 1F is a standard form of the image pickup apparatus. In the standard forms, the image pickup apparatus has a full-flat shape (an approximately cuboid shape). FIG. 2 is a diagram illustrating the image pickup apparatus with a cover portion 4 opened with respect to a camera body 1.

In FIGS. 1A to 1F, reference numeral 1 denotes a camera body. The camera body 1 constitutes a first housing. On the backside (rear side) of the camera body 1, a monitor unit 11 (a display unit) which displays an object image is provided. The camera body 1 includes, inside it, a processing circuit portion (a system configuration portion) which mainly performs video processing and functions of the image pickup apparatus, a battery (a power source), a video recording medium, and the like. Reference numeral 2 denotes a lens barrel which includes an imaging lens unit 2a (an image pickup optical system), a light emitting portion 2b that performs flash shooting, and the like. An opening portion that introduces an object image (object light) is formed in the lens barrel 2. Reference numeral 3 denotes a lens body which rotatably supports the lens barrel 2 in a panning direction and which includes a processing circuit which performs functions of the lens barrel 2 and the like. The lens barrel 2 and the lens body 3 together constitute a second housing. In this embodiment, (the opening portion of) the lens barrel 2 is configured to be rotatable with respect to the lens body 3 which is a part of the second housing.

FIGS. 1A to 1F illustrate a state in which the thicknesses of the lens barrel 2 and the lens body 3 are substantially within a range of a thickness Th of the camera body 1, and the heights of the lens barrel 2 and the lens body 3 are substantially within a range of a height Ht of the camera body 1. As described above, FIGS. 1A to 1F illustrate the image pickup apparatus which has a full-flat shape as a whole. The lens barrel 2 and the lens body 3 (the second housing) are located at a first rotation position (a position indicated by a symbol 0° in FIG. 1D) with respect to the camera body 1. In this embodiment, this state of the image pickup apparatus is referred to as a standard form.

Reference numeral 4 denotes a cover portion (a cover member) which is configured to be movably (rotatably) connected to (supported on) the camera body 1, which is configured to cover and protect an absorption portion described later. Reference numeral 5 denotes a power source portion (a power source button) that supplies a power to each portion of the image pickup apparatus, reference numeral 6 denotes a shutter button, and reference numeral 7 denotes a zoom lever. Reference numeral 8 denotes a rotary portion (a first rotary portion) which is provided between the camera body 1 (the first housing) and the lens body 3 (the second housing) to rotatably support the lens body 3 with respect to the lens barrel 2. Reference numeral 9 denotes a rotary portion (a second rotary portion) which rotatably supports the lens barrel 2 with respect to the lens body 3, and reference numeral 10 denotes a hinge portion which retains the cover portion openable/closable with respect to the camera body 1. Reference numeral 11 denotes a monitor unit which displays an image (an object image). The monitor unit 11 includes, for example, a touch panel which allows touch operations. The rotary portion 8 is configured to be rotatable around a rotation axis T (a first rotation axis). Therefore, the rotation of the rotary portion 8 allows the lens barrel 2 and the lens body 3 to rotate around the first rotation axis T at an angle of 180° with respect to the camera body 1 in the arrow direction indicated in FIG. 1D (FIG. 1D illustrates a state in which the rotation angle is 0°).

As illustrated in FIGS. 1C, 1D, and 1E, the rotary portion 8 (the first rotation axis as the rotational center of the rotary portion 8) is located at a position (shifted position) offset by a distance $S_1$ from a screen center $O_1$ in a plane direction horizontal to the screen of the monitor unit 11. Similarly, the rotary portion 8 (the first rotation axis as the rotational center of the rotary portion 8) is, in a thickness direction of the camera body 1 (direction orthogonal to the screen of the monitor unit 11), located at a position (shifted position) offset by a distance $S_2$ from the center line $O_2$ (center position) in the thickness direction.

In this embodiment, a distance from the rotational center of the rotary portion 8 to the center of the imaging lens unit 2a is defined as $LP_1$, and a distance from the rotational center of the rotary portion 8 to the lower end portion of the cover portion 4 is defined as $LP_2$. Likewise, a distance from the rotational center of the rotary portion 8 to the most far away part of the lens body 3 (the most far away part of the rear plane) is defined as $LP_3$, and a distance from the rotational center of the rotary portion 8 to the most far away part of the cover portion 4 observed when the cover portion 4 is rotated at an angle of 180° is defined as $LP_4$. In this embodiment, the distance $LP_4$ is substantially the same as the distance from the rotational center of the rotary portion 8 to the most far away part of the lens body 3 (the most far away part of the front plane). The configuration is designed to satisfy the relations of $LP_1 > LP_2$ and $LP_3 < LP_4$.

The lens barrel 2 is configured to be ±180° rotatable with respect to the lens body 3 in the arrow direction illustrated in FIG. 1A (the arrow illustrated at the right side of the drawing) by the rotation of the rotary portion 9 around a rotation axis P (a second rotation axis). The cover portion 4 is configured to be 180° rotatable at maximum with respect to the camera body 1 in the arrow direction illustrated in FIG. 1A (the arrow illustrated at the left side of the drawing) by the rotation of the hinge portion 10 around a rotation axis H (a third rotation axis).

FIG. 2 illustrates the cover portion 4 of the image pickup apparatus with it opened with respect to the camera body 1. Absorption portions 12a and 12b (a first absorption portion) are attached to the camera body 1. An absorption portion 12c (a second absorption portion) is attached to the cover portion 4. The absorption portions 12a, 12b, and 12c are shifted up and down with each other such that the absorption portions 12a and 12b (the first absorption portion) and the absorption portion 12c (the second absorption portion) do not interfere with each other when the cover portion 4 is fully closed. This embodiment, however, is not limited to this. Each absorption portion may be shifted to the left or the right. The number of absorption portions is also not limited.

Reference numeral 1a denotes a concave portion formed on the camera body 1. The concave portion 1a is provided to serve as a clearance portion of the absorption portion 12c (a housing portion for housing the absorption portion 12c) attached to the cover portion 4 when the cover portion 4 is closed. Reference numerals 4a and 4b denote concave portions formed on the cover portion 4. The concave portions 4a and 4b are provided to serve as clearance portions of the absorption portions 12a and 12b, which are attached to the camera body 1, when the cover portion 4 is closed. In this embodiment, the absorption portions 12a, 12b, and 12c include an adhesive gel member with a predetermined degree of thickness which is made of silicon or the like. This embodiment, however, is not limited to this, and thus other types of members may be used to form the absorption portions. Moreover, the closing of the cover portion 4 makes it possible to reduce the volume of undesired adhesion of dust and lint to the gel member in the case where the absorption portions 12a, 12b, and 12c are not used.

In this embodiment, the cover portion 4 is movably connected with respect to the camera body 1 between a first position where the cover portion 4 covers the absorption portions 12a, 12b, and 12c, and a second position where the cover portion 4 causes them to be exposed, i.e. where the absorption portions 12a, 12b, and 12c are exposed. The first position is that illustrated in each of FIGS. 1A to 1F, and the second position is, for example, that illustrated in FIG. 2. The second position is not limited to a position where the cover portion 4 is rotated at an angle of 180°, and can be set at any angle within a range of 0° to 180°. In this embodiment, the monitor unit 11 and the absorption portion 12a are arranged on the opposite planes of the camera body 1.

Figure 3A:
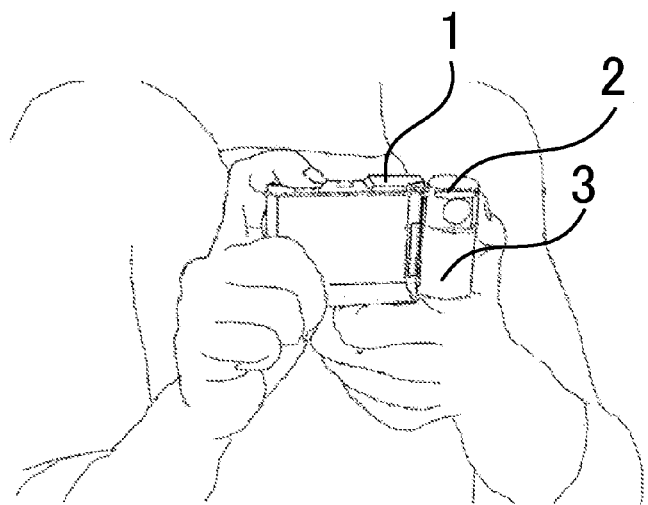
FIGS. 3A and 3B are diagrams illustrating states in which hand-held shooting with the image pickup apparatus in this embodiment is carried out.
Figure 3B:
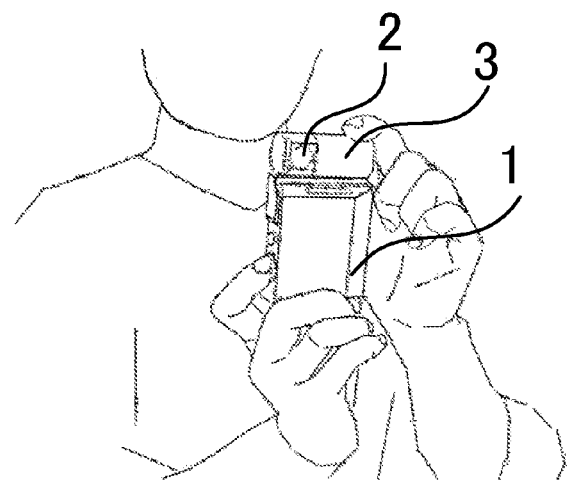

Subsequently, referring to FIGS. 3A to 8, various usages (use or installation situation) of the image pickup apparatus in this embodiment will be described. FIGS. 3A and 3B illustrate the usage in which a user carries out hand-held shooting (normal shooting) with the image pickup apparatus in this embodiment being in the standard form. Similarly, FIGS. 3A and 3B illustrate the usage in the cases of shooting in a horizontal position and shooting in a vertical position, respectively. The image pickup apparatus of this embodiment is, similarly to a typical camera, easy to carry and treat because of its full-flat shape.

Figure 4:
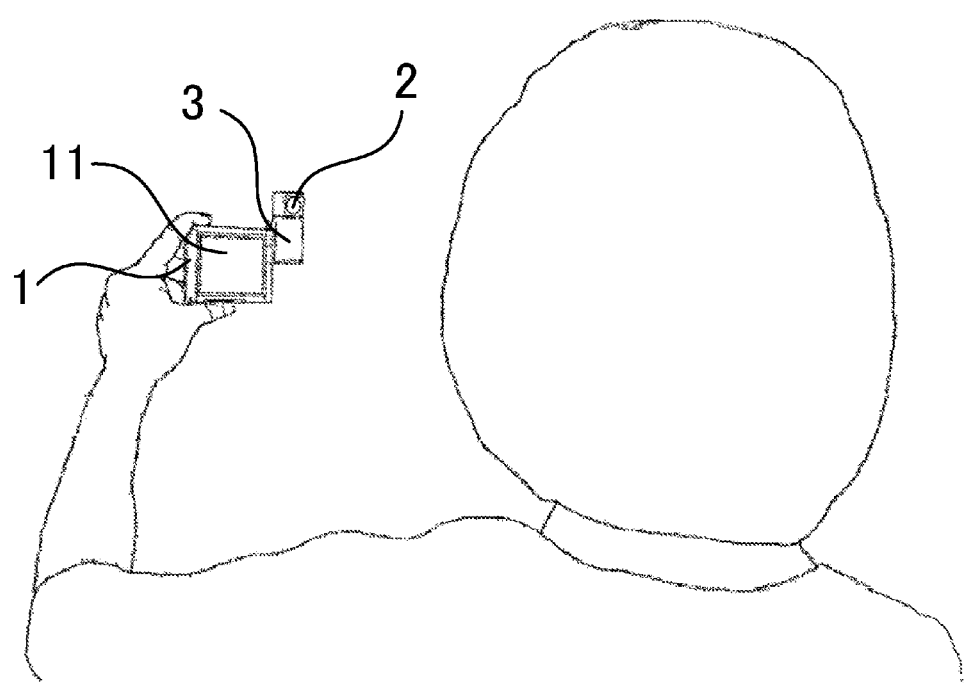
FIG. 4 is a diagram illustrating a state in which self-shooting with the image pickup apparatus in this embodiment is carried out.

FIG. 4 is a diagram illustrating a situation in which a user is carrying out so-called self-shooting. In this situation, the user is holding the camera body 1 upside down, with the lens body 3 of the image pickup apparatus being rotated by 180 degrees from the standard form. In self-shooting, a user carries out shooting while checking a frame state with an image displayed on the monitor unit 11 facing toward the user. As illustrated in FIG. 4, the lens barrel 2 protrudes upward beyond the height range of the camera body 1. Similarly, the lens barrel 2 and the lens body 3 extend off the thickness range of the camera body 1. In this state, the lens body 3 is located at a position (a second rotational position) of an approximately 180° rotation from the state as illustrated in FIGS. 1A to 1F. As described above, the lens body 3 (the second housing) is rotatable with respect to the camera body 1 (the first housing) between the first rotation position and the second rotation position by the rotation of the rotary portion 8.

When the lens body 3 is located at the first rotation position, the camera body 1, the lens barrel 2, the lens body 3, and the cover portion 4 covering the absorption portions 12a, 12b, and 12c take a form of a cuboid shape (approximately cuboid shape) as illustrated in FIGS. 1A to 1F. The "approximately cuboid shape" as used herein includes not only a strict cuboid shape, but also a shape which can be evaluated as a substantially cuboid shape. Furthermore, in this embodiment, when the lens body 3 is located at the second rotation position, it is possible to move the cover portion 4 to cause the absorption portions 12a, 12b, and 12c to be exposed while the opening portion which lets in an object image is located at the outside (the upper side as illustrated in FIG. 4) of the end portion (upper end portion) of the camera body 1.

The rotary portion 8 is located at a position offset from the center of the screen of the monitor unit 11 in the horizontal plane direction and at a position more offset than the center position in the thickness direction of the camera body 1. For this reason, the lens barrel 2 is located at a position protruding from the most far away part of the camera body 1. This positioning makes it possible to prevent an object light (object image) from vignetting by the camera body 1 even if panning or other similar operation is performed at that position.

Because the lens body 3 has rotated at an angle of only 180° at this time, an image formed on an image pickup element is positioned upside down. Even in such case, a user only has to carry out processing for flipping the shot image vertically with an image processing portion (a camera CPU 121 described later) built in the image pickup apparatus in order to display the shot image on the monitor unit 11 after sensing a positional relation between the lens body 3 and the camera body 1 with a sensor not illustrated in the drawings. During this operation, the shutter button 6, the zoom levers 7, and the like are impossible to operate because they are located at the bottom surface side. The shutter button 6, the zoom lever 7, and the like, however, are possible to operate by displaying so-called soft buttons (not illustrated in the drawing) of them on the monitor unit 11. In addition, self-shooting is possible to be carried out also by causing only the lens barrel 2 to rotate at an angle of 180° from its standard form. In this case, because the image is positioned upside down, the user only has to change an image to be displayed on the monitor unit 11 in the same manner as that described above.

Figure 5A:
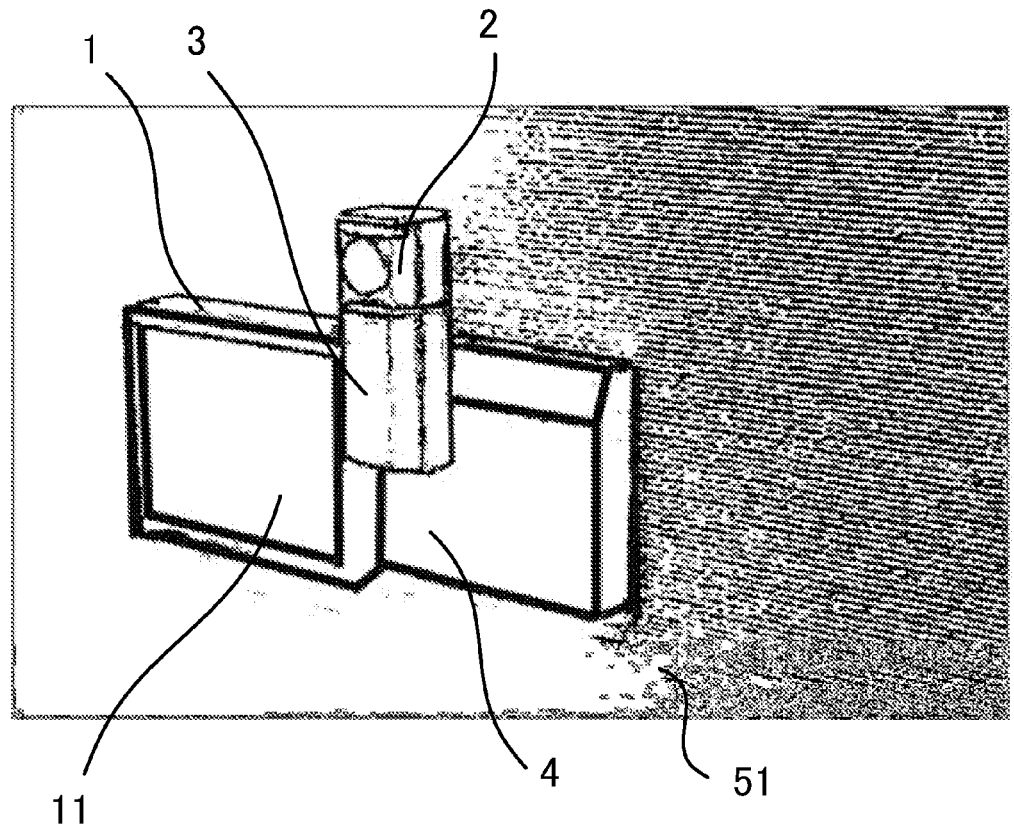
FIGS. 5A and 5B are diagrams illustrating states in which the image pickup apparatus in this embodiment is installed on a wall surface and a window glass, respectively.
Figure 5B:
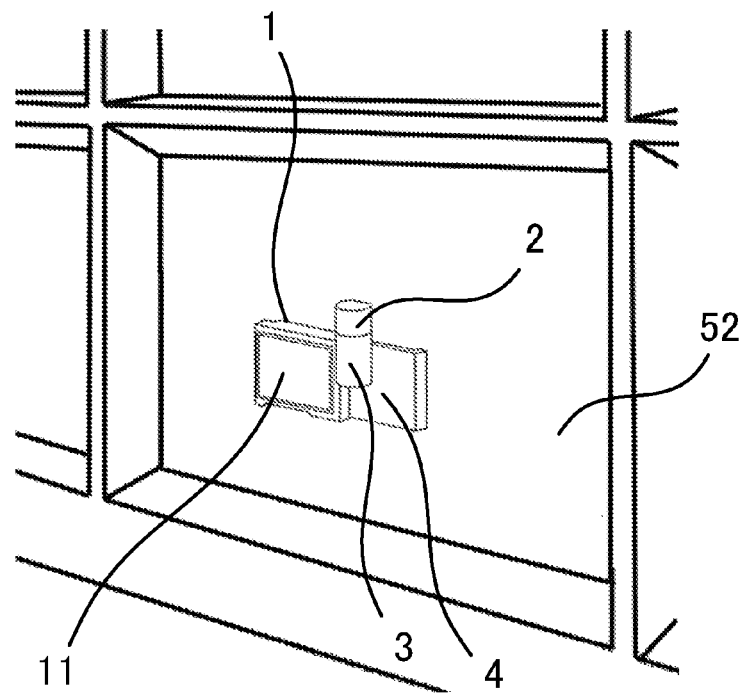

FIGS. 5A and 5B are diagrams illustrating cases in which the image pickup apparatus in this embodiment is installed directly on a flat part of a wall or a window to carryout shooting with a self timer or a remote controller in a shooting scene which normally requires a tripod. FIG. 5A illustrates a case in which an object, such as a user himself/herself, located at the near side of a wall 51 (wall surface) is photographed. With the lens barrel 2 and the lens body 3 being rotated at an angle of 180° by the rotary portion 8 and the cover portion 4 being opened at an angle of 180° with respect to the camera body 1, the absorption portions 12a and 12b of the camera body 1, and the absorption portion 12c of the cover portion 4 are pushed to a wall 51 to be absorbed to the wall 51. FIG. 5B illustrates a case in which a landscape such as especially night view is shot indoor through a window glass. In FIG. 5B, the image pickup apparatus is pushed to a window glass 52 to be absorbed to the window glass 52, with the lens barrel 2 being further rotated at an angle of 180° by the rotary portion 9 from the state as illustrated in FIG. 5A.

In either of the cases illustrated in FIGS. 5A and 5B, the rotary portion 8 is located at a position offset (shifted) from the screen center in the plane direction horizontal to the screen of the monitor unit 11 and at a position more offset than the center position in the thickness direction of the camera body 1. For this reason, the design which satisfies the relation of $LP_3 < LP_4$ allows the cover portion 4 to rotate at an angle of 180° while not mechanically interfering with the lens barrel 2 or the lens body 3 when the lens body 3 is rotated.

The rotation of the lens body 3 at an angle of 180° with the design which satisfies the relation of $LP_1 > LP_2$ causes the lens barrel 2 and the lens body 3 to protrude upward more outside than the cover portion 4, as illustrated in FIG. 5B. That is to say, the imaging lens unit 2a moves to a position where its shooting range is not shielded by the cover portion 4. This positioning makes it possible to prevent an angle of view from vignetting by the cover portion 4 even if the lens barrel 2 is unrestrictedly panned according to an installation place or an object's position condition.

Figure 6A:
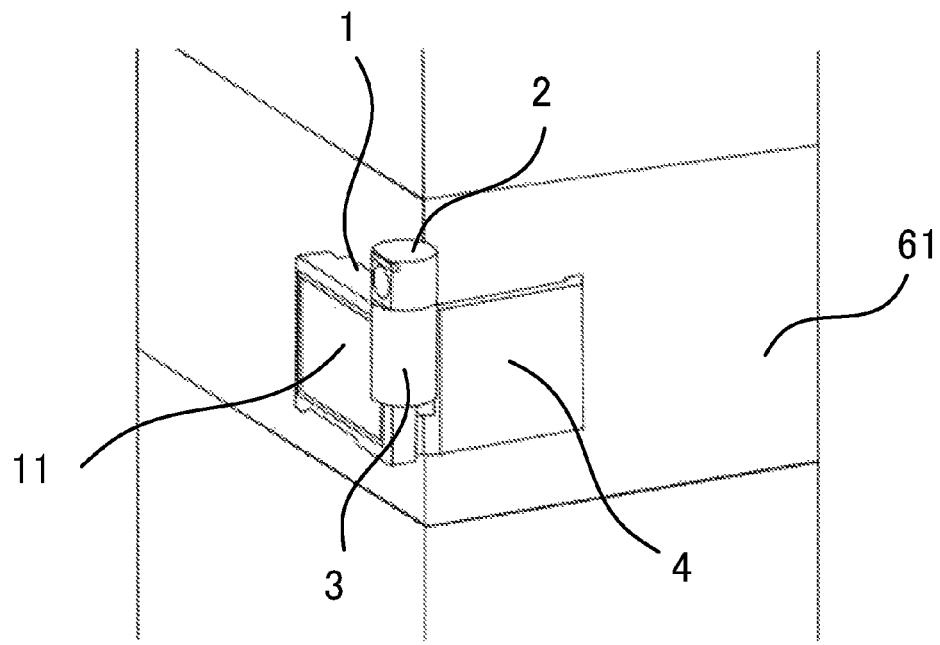
FIGS. 6A and 6B are diagrams illustrating states in which the image pickup apparatus in this embodiment is installed on the corner of a building and a utility pole, respectively.
Figure 6B:
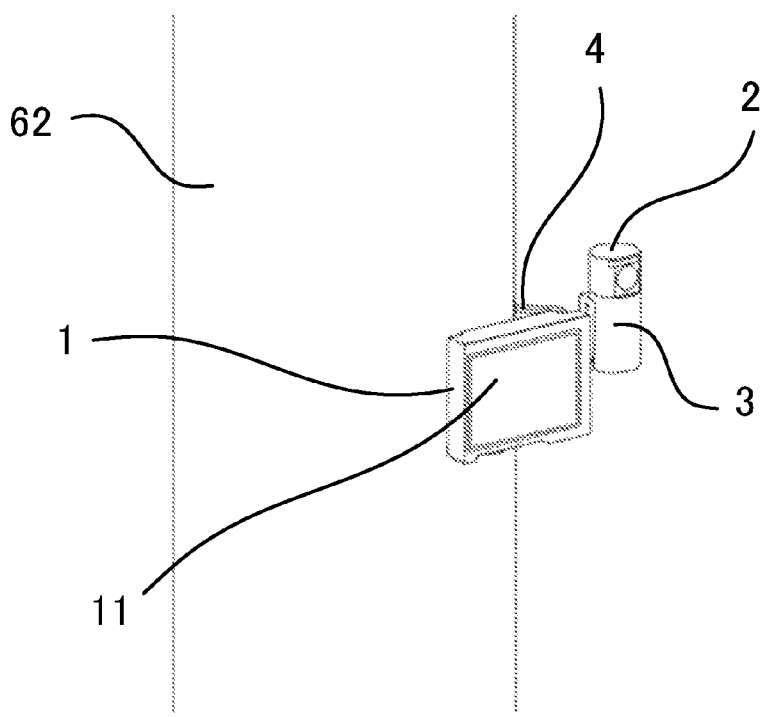

In FIGS. 5A and 5B, although the cover portion 4 is opened at an angle of 180° to be absorbed to the wall with flat shape 51 or the glass surface (window glass 52), the cover portion 4 is unrestrictedly rotatable within a range of 0° to 180°. This allows the image pickup apparatus of this embodiment to be installed also on parts other than the wall, as illustrated in FIGS. 6A and 6B. Also in this case, similarly to FIGS. 5A and 5B, the lens barrel 2 protrudes from the outside shape of the camera body 1 due to the position of the rotary portion 8.

FIG. 6A is a diagram illustrating a state in which the image pickup apparatus in this embodiment is installed on a pole 61 (corner) of a building. In FIG. 6A, the cover portion 4 is opened at an angle of approximately 90° with respect to the camera body 1 to cause the absorption portions 12a and 12b, and the absorption portion 12c to be absorbed on two different planes of the pole 61. FIG. 6B is a diagram illustrating a state in which the image pickup apparatus is installed on a round column 62 such as a utility pole. As illustrated in FIG. 6B, when the image pickup apparatus is to be installed on the round column 62, the angle (opening angle) of the cover portion 4 is changed according to the diameter of the round column 62, and then each absorption portion is absorbed to either of the two positions located on a curved plane of the round column 62.

Figure 7A:
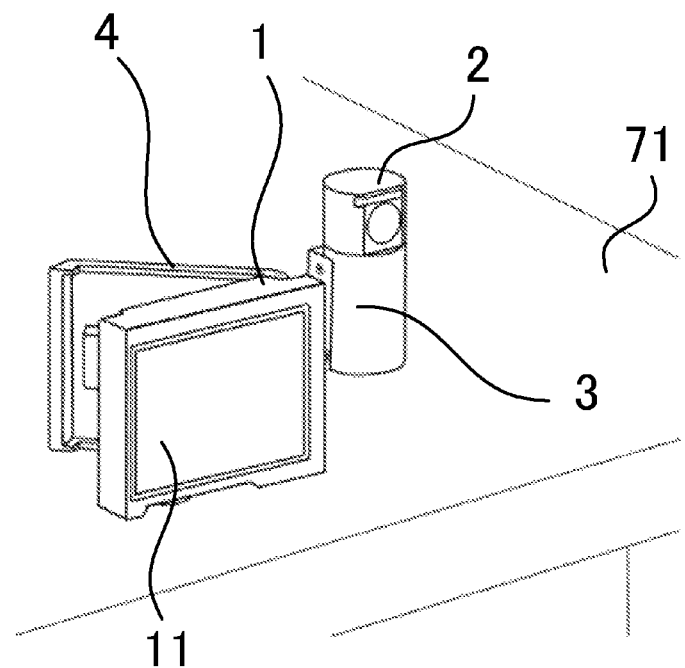
FIGS. 7A and 7B are diagrams illustrating states in which the image pickup apparatus in this embodiment is installed on a desk.
Figure 7B:
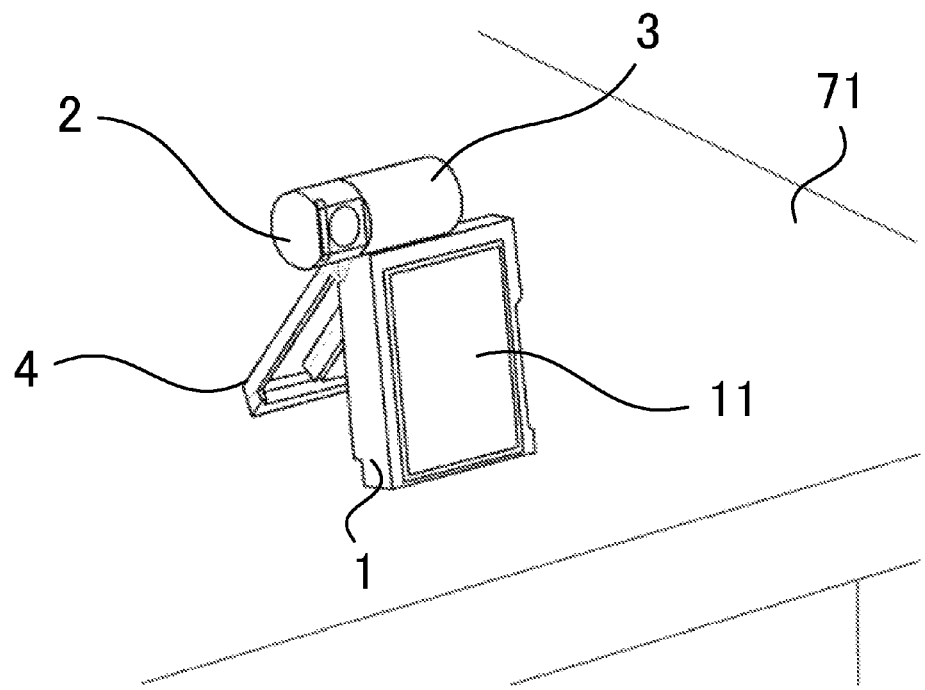

FIGS. 7A and 7B are diagrams illustrating states in which the image pickup apparatus in this embodiment is installed on a flat plane 71. Also in this case, similarly to FIGS. 5A and 5B, the lens barrel 2 protrudes from the outside shape of the camera body 1 due to the position of the rotary portion 8. FIG. 7A illustrates a state in which the camera body 1 is installed upside down on a flat plane 71, such as a desk, for shooting in a horizontal position, with the lens body 3 being rotated at an angle of 180° and the cover portion 4 being opened if required. In this case, no absorption portion is used. In this embodiment, the weight of the camera body 1 is heavier than the combined total weight of the lens barrel 2 and the lens body 3. This makes it possible to firmly install the image pickup apparatus on the flat plane 71 such as a desk, with the cover portion 4 opened. As described above, it is possible to adjust a shooting range in a panning direction by causing the lens barrel 2 to rotate if an object is suitably positioned.

FIG. 7B illustrates a state in which shooting in a vertical position is carried out, with the image pickup apparatus being rotated at an angle of 90° from the state as illustrated in FIG. 7A. In this case, a friction or click-stop position may be provided between the cover portion 4 and the camera body 1 to prevent the cover portion 4 from opening. In the states as illustrated in FIGS. 7A and 7B, it is effective that a rubber member is sealed at, for example, the bottom surface of the camera body 1 or the edge part of the cover portion 4 in order to make them difficult to slide even on a smooth surface.

Figure 8:
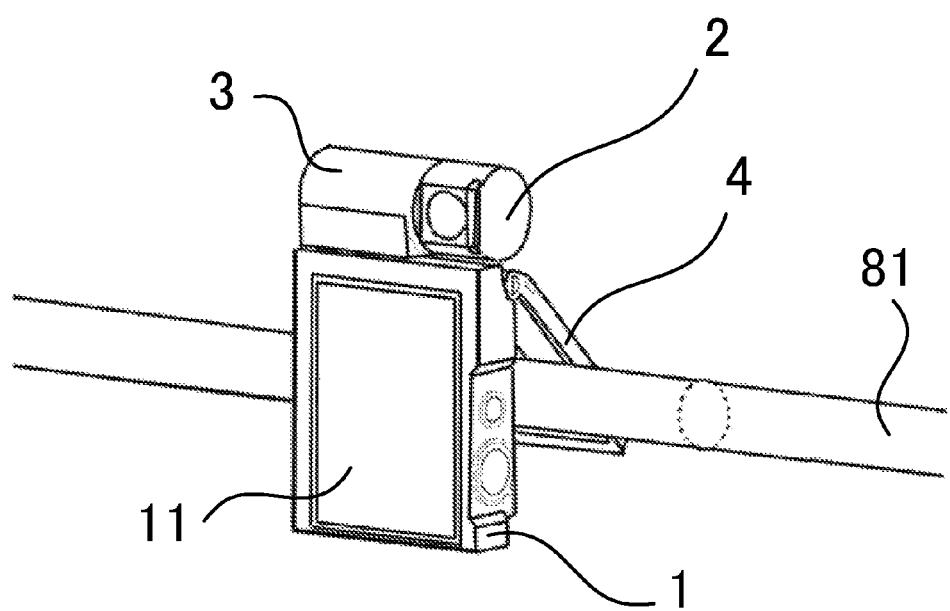
FIG. 8 is a diagram illustrating a state in which the image pickup apparatus in this embodiment is installed on a handrail.

FIG. 8 is a diagram illustrating a state in which the image pickup apparatus in this embodiment is installed on a handrail 81. The opening angle of the cover portion 4 is adjusted to cause two different absorption portions, that is, the absorption portions 12a and 12b attached to the camera body 1, and the absorption portion 12c attached to the cover portion 4 to be absorbed and fixed to a handrail 81 with cylindrical shape. This allows the camera body 1 to be firmly installed, while it from rotating. In this case, the rotation of the lens barrel 2 makes it possible to adjust a shooting range in tilt directions (the upper and lower directions illustrated in FIG. 8).

As described above, in the image pickup apparatus of this embodiment, the lens barrel 2, the lens body 3, and the cover portion 4 are configured to be movable (rotatable) with respect to the camera body 1 which has the monitor 11. This configuration makes it possible to obtain advantages including those shown below as representative examples. The first advantage is that the image pickup apparatus of this embodiment is convenient to carry because it is full-flat during normal time. The second advantage is that the image pickup apparatus is capable of performing shooting operations with each absorption portion being absorbed to various types of planes, which eliminates a need for carrying a tripod or other similar supporting tool. The third advantage is that shooting can be carried out, for example, through a glass with the image pickup apparatus being affixed to the glass while preventing an object light from vignetting. The reason for this is that since the rotation axes of the camera body 1 and the lens body 3 are formed at positions offset in two different directions (thickness direction and height direction), the lens barrel 2 protrudes from the camera body 1 when the lens body 3 is rotated. The fourth advantage is that the image pickup apparatus can be firmly installed not only on a flat plane, but also on a square pole, a round pole, a desk, a handrail, and other similar places. The image pickup apparatus of this embodiment can achieve at least one of these advantages.

Figure 9:
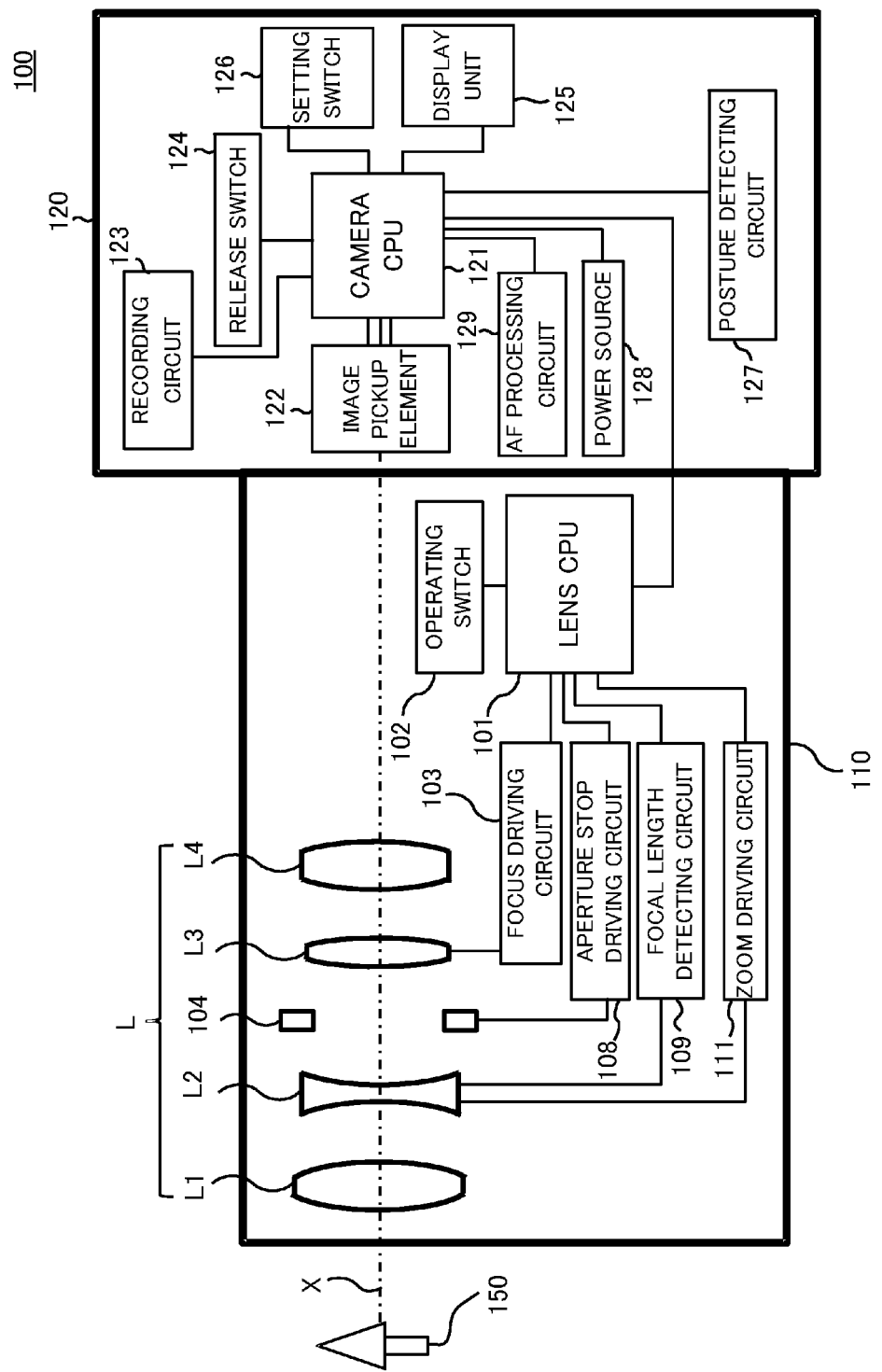
FIG. 9 is a block diagram of the image pickup apparatus in this embodiment.

Subsequently, referring to FIG. 9, the system configuration of the image pickup apparatus in this embodiment will be described. FIG. 9 is a block diagram of an image pickup apparatus 100 (an image pickup system). The image pickup apparatus 100 has a camera body 120 (which corresponds to the camera body 1) including an image pickup element 122 and a lens portion 110 (which corresponds to the lens barrel 2 and the lens body 3) integrated into the camera body 120. A lens CPU 101 inside the lens portion 110 and a camera CPU 121 inside the camera body 120 are connected with each other so that a signal can be transmitted and received between them. The lens CPU controls operations performed inside the lens portion 110.

Reference symbols L1 to L4 denote lens units. The lens units L1 and l4 are fixed lenses, the lens unit L2 is a magnification-varying lens unit, and the lens unit L3 is a focus lens unit. The lens unit L2 is capable of moving in an optical axis direction (an X direction) when it receives an output from a zoom driving circuit 111 after the zoom driving circuit 111 receives a control signal form the lens CPU 101. This movement allows the focal length of an image pickup optical system to be changed. The lens unit L3 is capable of performing focus adjustment of the image pickup optical system by moving in the optical axis direction (the X direction). Reference numeral 104 denotes a light amount adjusting apparatus (an aperture stop apparatus) which changes an aperture diameter through which light passes by moving a plurality of aperture stop blades in a plane approximately orthogonal to the optical axis direction. An aperture driving circuit 108 receives the control signal from the lens CPU 101 and then drives the light amount adjusting apparatus 104. The lens units L1 to L4 and the light amount adjusting apparatus 104 together constitute an image pickup optical system L. The image of an object 150 (an object image) passes through the lens portion 110 and then enters the image pickup element 122 of the camera body 120.

Reference numeral 102 denotes an operating switch. The operating switch 102 is used for operations such as zooming, focusing, and aperture value setting which are manually operated, and for auto/manual focus switching. Reference numeral 103 denotes a focus driving circuit for performing focus adjustment. The focus driving circuit drives the lens unit L3 based on the control signal from the lens CPU 101. A rotation member which rotates by the driving of a focus driving motor is provided with a pulse generating unit. The pulse generating unit outputs to the focus driving circuit 103 a pulse signal corresponding to the rotation of the rotation member. The lens CPU 101 detects the pulse signal output from the pulse generating unit to detect the position of the lens unit L3.

Reference numeral 109 denotes a focal length detecting circuit which detects the position of the magnification-varying lens unit L2 to detect the position of the image pickup optical system L. The focal length detecting circuit 109 detects, for example, the position of the lens unit L2 with the use of a gray code pattern which divides the position of the lens unit L2 into 32 parts. In a memory provided inside the lens CPU 101, the focal length information of the lens portion 110, the focus movement amount of the image pickup element 122 with respect to the movement amount of the lens unit L3 (focus sensitivity), and other information are stored for each divided focal length.

The object light (object image) passing through the image pickup optical system L of the lens portion 110 is formed on the imaging surface (light receiving surface) of the image pickup element 122. The image pickup element 122 includes a photoelectric conversion element such as a CCD or CMOS sensor to photoelectrically convert the optical image (the object image) to an electric signal. The signal read from the image pickup element 122 is subjected to amplification processing and A/D conversion processing, and then output to the camera CPU 121 as a digital video signal. The image pickup apparatus 100 of this embodiment uses this digital video signal to form a moving or still image.

The digital video signal is output not only to the camera CPU 121, but also to an AF processing circuit 129 (an auto focus processing circuit). When the digital video signal is input to the AF processing circuit 129, a high frequency component in image data for one screen is extracted via a high-pass filter or the like, and then processing such as cumulative addition is performed for this high frequency component. As a result, an AF evaluation value corresponding to the amount of outline components at the high frequency side is determined. After that, focus detection by the so-called contrast detection method can be performed by moving the lens unit L3 to a position at which a peak AF evaluation value is indicated. The AF evaluation value determined by the AF processing circuit 129 is output to the camera CPU 121.

The focus adjustment operation in the image pickup apparatus 100 is performed by moving the lens unit L3 to the optical axis direction (X direction) based on the contrast detection method and the focus sensitivity information stored in the lens CPU 101. Since the focus adjustment by the contrast detection method is known art, the detailed description thereof will be omitted.

Reference numeral 124 denotes a release switch (which corresponds to the shutter button 6 described above) composed of a double action switch. The release switch 124 has a switch (SW1) for use in starting shooting preparation operations including photometry, focus detection, and in-focus operation, and a switch (SW2) for use in starting exposure to the image pickup element 122. The camera CPU 121 inputs an output signal from the release switch 124 to perform operations according to an input signal.

The camera CPU 121 performs a driving control of a display unit 125 (which corresponds the monitor unit 11 described above), and control operations corresponding to an input from a setting switch 126 which makes various settings, such as shooting mode setting, by means of touch operations to the display unit 125. The camera CPU 121 further performs a display control for the display unit 125 corresponding to an output from a posture detecting circuit 127 which detects the posture of the image pickup apparatus 100, and checking of the remaining capacity and control of power sharing of a power source 128. On the display unit 125, a moving or still image shot by using the image pickup element 122, for example, is displayed. Reference numeral 123 denotes a recording circuit for causing a recording medium removable with respect to the camera body 120 to record a video signal. In this embodiment, various buffer memories are included in the camera CPU 121.

As described above, according to this embodiment, it is possible to provide an image pickup apparatus which enables easy and appropriate shooting in various shooting situations. The image pickup apparatus of this embodiment has some advantages. First, the image pickup apparatus of this embodiment is convenient to carry because it is normally full-flat. Second, the image pickup apparatus is capable of performing shooting operations with each absorption portion being absorbed to various types of planes, which eliminates a need for carrying a tripod or other similar supporting tool. Third, shooting can be carried out, for example, through a glass with the image pickup apparatus being affixed to the glass while preventing an object light from vignetting. The reason for this is that since the rotation axes of the camera body 1 and the lens body 3 are formed at positions offset (shifted) in two different directions (thickness direction and height direction, the lens barrel 2 protrudes from the camera body 1 when the lens body 3 is rotated. Fourthly, the image pickup apparatus can be firmly installed not only on a flat plane, but also on a square pole, a round pole, a desk, and a handrail.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2013-012935, filed on Jan. 28, 2013, which is hereby incorporated by reference herein in its entirety.

What is claimed is:

1. An image pickup apparatus comprising:
a first housing including a display unit;
a second housing including an image pickup optical system;
a rotary portion provided between the first housing and the second housing and rotatably supporting the second housing with respect to the first housing;
a first absorption portion attached to the first housing;
a cover member movably connected with respect to the first housing and covering the first absorption portion; and
a second absorption portion attached to the cover member,
wherein the cover member is movably connected with respect to the first housing between a first position where the cover member covers the first absorption portion and a second position where the first absorption portion is exposed, and
wherein a concave portion is formed on the first housing, and the concave portion is configured to house the second absorption portion when the cover member is located at the first position.

2. The image pickup apparatus according to claim 1, wherein the first absorption portion and the second absorption portion are shifted from each other so as not to interfere when the cover member is located at the first position.

3. The image pickup apparatus according to claim 1, wherein the second housing is rotatable with respect to the first housing between a first rotational position and a second rotational position by a rotation of the rotary portion,
wherein when the second housing is located at the first rotational position, the first housing, the second housing, and the cover member covering the first absorption portion form a cuboid shape, and
wherein when the second housing is located at the second rotational position, the cover member is configured to be movable to allow the first absorption portion to be exposed, and an opening portion that introduces an object image is configured to be located at an outside of an end portion of the first housing.

4. The image pickup apparatus according to claim 3, wherein the opening portion of the second housing is configured to be rotatable with respect to the second housing.

5. The image pickup apparatus according to claim 1, wherein a rotational center of the rotary portion is located at a position shifted from a center of a screen of the display unit in a plane direction horizontal to the screen of the display unit.

6. The image pickup apparatus according to claim 1, wherein a rotational center of the rotary portion is located at a position shifted from a center position in a thickness direction of the first housing.

7. The image pickup apparatus according to claim 1, wherein the display unit and the first absorption portion are arranged on opposite planes of the first housing.

8. An image pickup apparatus comprising:
a first housing including a display unit;
a second housing including an image pickup optical system;
a rotary portion provided between the first housing and the second housing and rotatably supporting the second housing with respect to the first housing;
a first absorption portion attached to the first housing and exposed on an exterior surface of the first housing; and
a cover member movably connected with respect to the first housing and covering the first absorption portion,
wherein the first absorption portion includes an adhesive gel member.

* * * * *